(12) United States Patent
Park et al.

(10) Patent No.: US 9,207,492 B2
(45) Date of Patent: Dec. 8, 2015

(54) BACK LIGHT UNIT AND METHOD FOR ASSEMBLING THE SAME

(75) Inventors: Jin-seo Park, Paju-si (KR); Hyun-Woo Jang, Goyang-si (KR); Jin-Taek Choi, Paju-si (KR); Joo-Young Yeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 147 days.

(21) Appl. No.: 12/965,112

(22) Filed: Dec. 10, 2010

(65) Prior Publication Data

US 2011/0141158 A1 Jun. 16, 2011

(30) Foreign Application Priority Data

Dec. 11, 2009 (KR) .................. 10-2009-0123257

(51) Int. Cl.
*G09G 3/36* (2006.01)
*G02F 1/1335* (2006.01)

(52) U.S. Cl.
CPC ............... *G02F 1/133608* (2013.01); *G02F 2001/133612* (2013.01); *Y10T 29/49826* (2015.01)

(58) Field of Classification Search
USPC .......................................................... 345/102
See application file for complete search history.

(56) References Cited

U.S. PATENT DOCUMENTS

| | | | |
|---|---|---|---|
| 8,212,961 B2 | 7/2012 | Kim | |
| 2007/0052663 A1 | 3/2007 | Kim et al. | |
| 2007/0247870 A1* | 10/2007 | Sakai et al. | 362/612 |
| 2008/0002392 A1* | 1/2008 | Kim | 362/97 |
| 2008/0055534 A1 | 3/2008 | Kawano | |
| 2009/0174838 A1 | 7/2009 | Park et al. | |
| 2009/0290097 A1* | 11/2009 | Kim et al. | 349/65 |
| 2010/0188840 A1* | 7/2010 | Cho et al. | 362/97.1 |
| 2010/0195018 A1* | 8/2010 | Kim | 349/60 |

FOREIGN PATENT DOCUMENTS

| | | |
|---|---|---|
| CM | 1963613 A | 5/2007 |
| CN | 1687829 A | 10/2005 |
| CN | 101071234 A | 11/2007 |
| CN | 101078835 A | 11/2007 |
| CN | 101135810 A | 3/2008 |
| CN | 201097049 Y | 8/2008 |
| CN | 101290429 A | 10/2008 |
| CN | 101389898 A | 3/2009 |
| CN | 101672991 A | 3/2010 |
| CN | 101769511 A | 7/2010 |
| KR | 10-0696112 B1 | 3/2007 |
| KR | 10-2009-0002352 A | 1/2009 |
| KR | 10-2009-0084380 A | 8/2009 |
| TW | 200602589 | 1/2006 |
| TW | 200848875 A | 12/2008 |
| TW | M366108 U1 | 10/2009 |

* cited by examiner

*Primary Examiner* — William Boddie
*Assistant Examiner* — Alecia D English
(74) *Attorney, Agent, or Firm* — Birch, Stewart, Kolasch & Birch, LLP

(57) ABSTRACT

A back light unit is disclosed, of which thinness is easily provided. The back light unit comprises at least one light source substrate having one surface provided with at least one light source and the other surface provided with a connector to which a driving power source for driving the light source is input; a bottom cover receiving the light source substrate therein, wherein the bottom cover includes at least one opening, so that the connector is projected to the outside of the bottom cover, the opening passing through a rear surface of the bottom cover.

4 Claims, 7 Drawing Sheets

BACK LIGHT UNIT AND METHOD FOR ASSEMBLING THE SAME

This application claims the benefit of the Korean Patent Application No. 10-2009-0123257, filed on Dec. 11, 2009, which is hereby incorporated by reference as if fully set forth herein.

BACKGROUND OF THE INVENTION

1. Field of the Invention

The present invention relates to a back light unit, and more particularly, to a back light unit and a method for assembling the same, in which thinness of the back light unit is easily provided.

2. Discussion of the Related Art

Generally, a liquid crystal display is one of flat panel displays that display images using a liquid crystal, and is widely used over the whole field of industry owing to its advantageous characteristics of thin profile, lightness in weight, and low power consumption.

Since the liquid crystal display is a non-light emitting device in which a liquid crystal display panel for displaying images does not emit light for itself, a back light unit that supplies light is required.

The back light unit includes a plurality of light emitting diodes and a connector supplying a driving power source required for driving the light emitting diodes. Since the connector is formed at a bezel portion of the liquid crystal display, a problem occurs in that an area of the bezel portion increases. In other words, the size of the back light unit increases as the area of the bezel portion increases, whereby there occurs difficulty in thinning the back light unit.

SUMMARY OF THE INVENTION

Accordingly, the present invention is directed to a back light unit and a method for assembling the same, which substantially obviate one or more problems due to limitations and disadvantages of the related art.

An object of the present invention is to provide a back light unit and a method for assembling the same, in which an opening is formed to pass through a rear surface of a bottom cover, and a connector is projected toward the outside through the opening, whereby a space occupied by the connector can be reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a back light unit according to the present invention comprises at least one light source substrate having one surface provided with at least one light source and the other surface provided with a connector to which a driving power source for driving the light source is input; a bottom cover receiving the light source substrate therein, wherein the bottom cover includes at least one opening, so that the connector is projected to the outside of the bottom cover, the opening passing through a rear surface of the bottom cover.

The back light unit further comprises a light source driving integrated circuit formed on the rear surface of the bottom cover, generating the driving power source; and a signal transmission portion electrically connecting the light source driving integrated circuit with the connector and transmitting the driving power source from the light source driving integrated circuit to the connector.

The signal transmission portion is a flexible printed circuit.

The back light unit further comprises a light guide plate received in the bottom cover to be arranged at one side of the light source substrate, guiding light emitted from a light source of the light source substrate to a display panel.

The light source substrate and the light guide plate are received in the bottom cover in a plural number, one light source substrate and one light guide plate form one unit light block in pairs, the display panel is divided into display regions corresponding to the number of unit light blocks, and each unit light block provides light to the corresponding display region.

The rear surface of the bottom cover is provided with a plurality of openings that project each connector of each light source substrate to the outside of the bottom cover.

The back light unit further comprises a light source driving integrated circuit formed on the rear surface of the bottom cover, generating the driving power source, wherein the respective connectors are individually connected to the light source driving integrated circuit through different signal transmission portions.

The light source substrate is any one of a flexible light source substrate, a light source substrate of a metal material, and a light source substrate of FR4 material.

The light source is a side view type light emitting diode of a side emission mode.

The connector has the same size as that of the opening so that a side edge of the connector is in contact with an inner wall of the connector.

The back light unit further comprises a buffer formed between the inner wall of the opening and the side edge of the connector.

The buffer is attached to the inner wall of the opening.

The buffer is of a rubber material having elasticity.

In another aspect of the present invention, a method for assembling a back light unit comprises preparing a plurality of light source substrates having one surface provided with at least one light source and the other surface provided with a connector to which a driving power source for driving the light source is input; forming a plurality of openings in a bottom cover, the openings passing through a rear surface of the bottom cover; and receiving the light source substrates in the bottom cover so that each connector of each light source substrate is projected to the outside of the bottom cover through each opening.

The method further comprises providing a light source driving integrated circuit, which generates the driving power source, on the rear surface of the bottom cover; and individually connecting the respective connectors projected toward the outside of the bottom cover through the opening with the light source driving integrated circuit through different signal transmission portions.

The method further comprises preparing a plurality of light guide plates corresponding to the number of the light source substrates; and respectively providing the corresponding light guide plate at one side of each light source substrate.

The connector has the same size as that of the opening so that a side edge of the connector is in contact with an inner wall of the connector.

The method further comprises forming a buffer between the inner wall of the opening and the side edge of the connector.

According to the back light unit and the method for assembling the same, the following advantages can be obtained.

First, since the opening is formed to pass through the rear surface of the bottom cover and the connector is projected toward the outside through the opening, the space occupied by the connector can be reduced.

Second, the opening is formed at the almost same size as that of the connector, or the opening is formed at the same size as that of the connector so that the side edge of the connector is in contact with the inner wall of the connector, whereby the light source substrate connected with the connector can be prevented from moving. In this case, a fixed projection formed on the bottom of the bottom cover is removed, whereby a receiving space of the bottom cover can be used more effectively.

Finally, the opening is formed at the almost same size as that of the connector, and the buffer is formed between the inner wall of the opening and the side edge of the connector, whereby the light source substrate can more effectively be prevented from moving.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
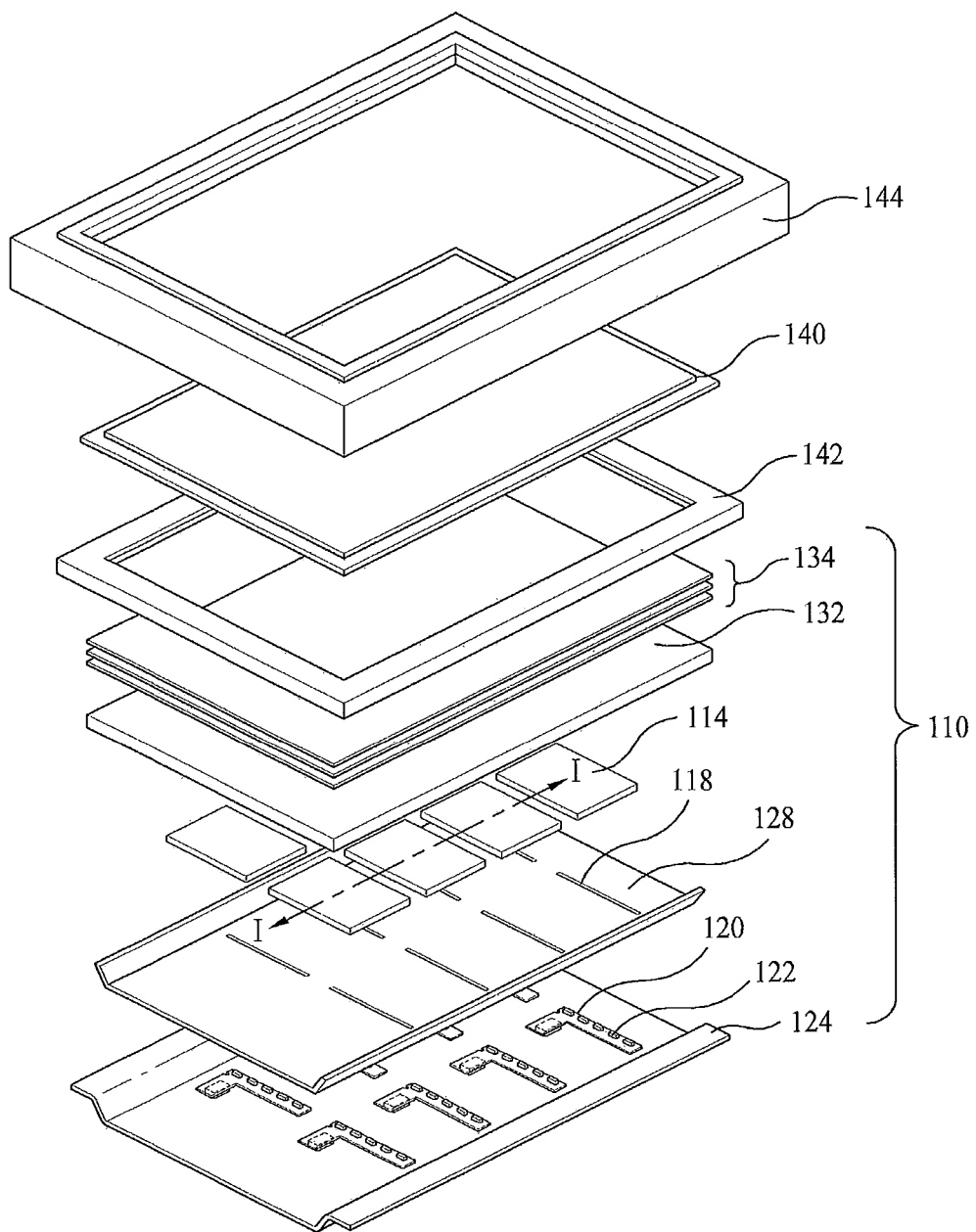
FIG. 1 is a perspective view illustrating a liquid crystal display module according to the embodiment of the present invention.
Figure 2:
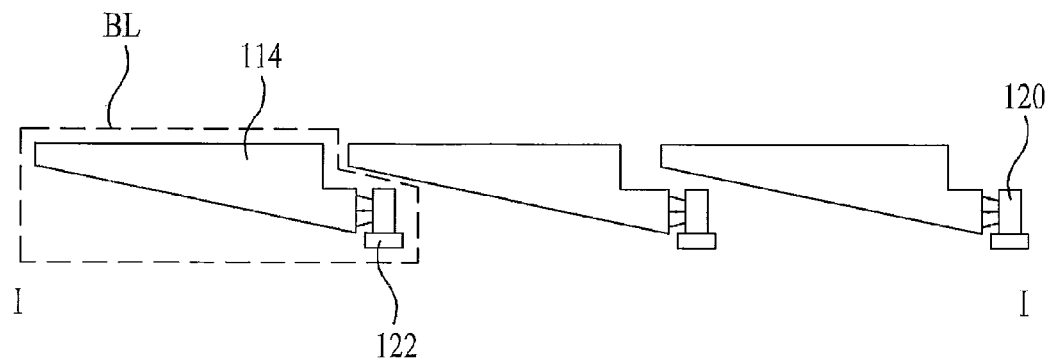
FIG. 2 is a sectional view taken along line I~I of FIG. 1.

FIG. 1 is a perspective view illustrating a liquid crystal display module according to the embodiment of the present invention, and FIG. 2 is a sectional view taken along line I~I of FIG. 1.

The liquid crystal display module shown in FIG. 1 includes a liquid crystal display panel 140, a back light unit 110, a mold frame 142, a top case 144, and a bottom cover 124.

The liquid crystal display panel 140 includes liquid crystal cells arranged between an upper substrate and a lower substrate in an active matrix arrangement, wherein each of the liquid crystal cells is provided with a thin film transistor for switching a video signal. A refractive index of each of the liquid crystal cells is varied depending on the video signal, whereby a picture image corresponding to the video signal is displayed.

The top case 144 is manufactured in a rectangular belt type having a plane portion and a side portion which are bent at a right angle. This top case 144 fitted into a side of the mold frame 142 while surrounding the edge of the liquid crystal display panel 140.

The bottom cover 124 is assembled into the mold frame 142 while covering a rear surface of the back light unit 110.

The mold frame 142 is formed of a plastic material or aluminum alloy material, and its inner sidewall is molded in a step type. The liquid crystal display panel 140 is mounted on the step surface of the mold frame 142.

The back light unit 110 includes a plurality of light sources 120, a plurality of light source substrates 122, a plurality of light guide plates 114, a reflective sheet 128, a diffusion plate 132, and a plurality of optical sheets 134.

The reflective sheet 128 is arranged between the light guide plates 114 and the bottom cover on which the light source substrates 122 are mounted, and prevents light generated from the light sources 120 from being emitted to the rear surface of the light guide plates 114. This reflective sheet 128 is provided with holes 118 corresponding to the light sources 120 mounted on the light source substrates 120. The light sources 120 are projected toward the light guide plates 114 through the holes 118.

Each light guide plate 114 guides light from the light sources 120 to the liquid crystal display panel 140.

The plurality of optical sheets 134 disperse and condense the light emitted from the light guide plates 114 and increase luminance, thereby improving efficiency of light and irradiating the light to the liquid crystal display panel 140. To this end, the plurality of optical sheets 134 include a condensing sheet, a diffusion sheet and a polarizing sheet (DBEF).

The light sources 120 are mounted on the respective light source substrates 122 and are supplied with a driving power source from a light source driving integrated circuit to generate light. To this end, the light source is formed on one surface of each light source substrate, and a connector is formed on the other surface of each light source substrate, wherein the driving power source is input to the connector to drive the light source. Any one of a flexible light source substrate, a light source substrate of a metal material, and a light source substrate of FR4 material can be used as the light source substrate 122.

The light sources 120 are comprised of light emitting diodes of a side view type, in which an emitting direction of light is directed toward a light incident portion which is a side of each light guide plate 114. In other words, the light sources 120 are side view type light emitting diodes of a side emission mode.

As shown in FIG. 2, one light source substrate 122, which includes a plurality of light sources 120, and one light guide plate 114 form one unit light block (BL) in pairs. The liquid crystal display panel is divided into display regions corresponding to the number of unit light blocks. In this case, each unit light block is divisionally driven in a local dimming type. In other words, if the light sources 120 of any one of a plurality of unit light blocks (BL) are turned on, the light sources 120 of the other unit light blocks are turned off, or turned on at luminance lower than that of the turned-on light sources 120 of the unit light block.

Figure 3:
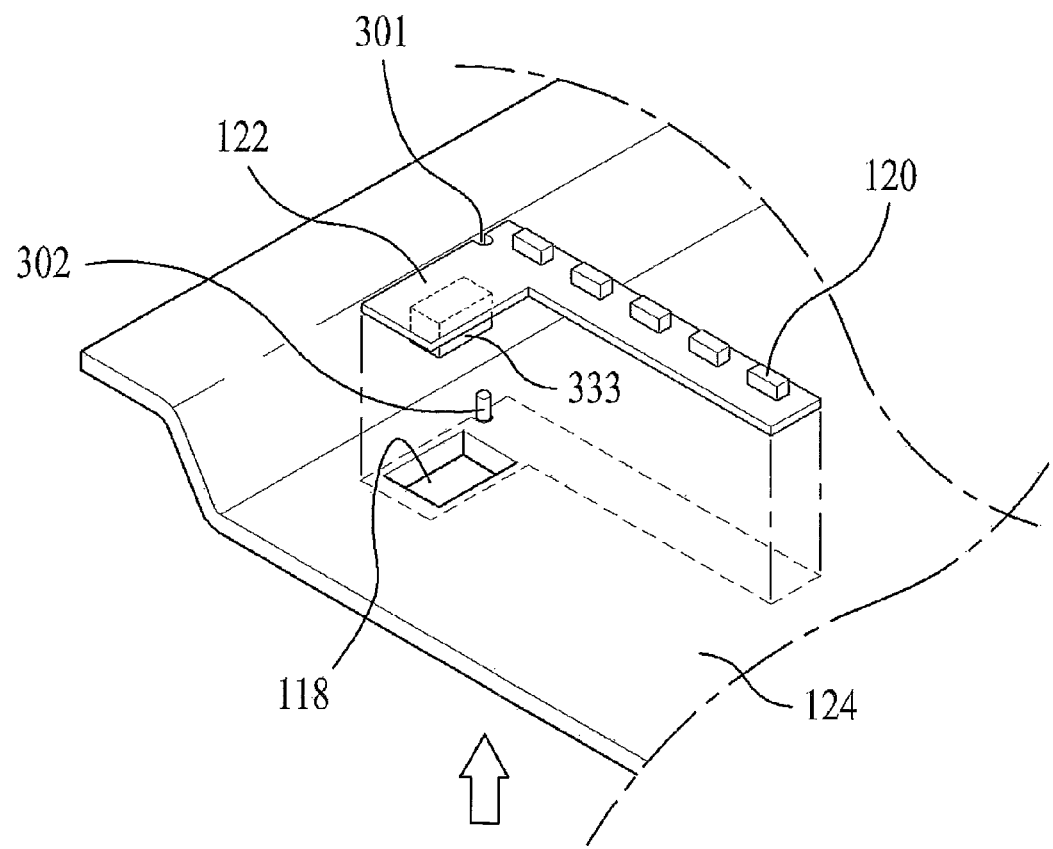
FIG. 3 is a detailed view illustrating a structure of a bottom cover and a structure of a light source substrate of FIG. 1.

FIG. 3 is a detailed view illustrating a structure of the bottom cover 124 and a structure of one light source substrate 122 of FIG. 1.

As shown in FIG. 3, the plurality of light sources 120 are formed on one surface of the light source substrate 122, and a connector 333 is formed on the other surface of the light source substrate 122, wherein a driving power source for driving the light sources 120 is input to the connector 333. Meanwhile, a fixed groove 301 is formed at a side of the light source substrate 122, and is fixed into a fixed projection 302 projected from the bottom of the bottom cover 124. Namely, as the fixed projection 302 is fitted into the fixed groove 301, the light source substrate 122 is fixed to the bottom cover 124. In similar, the other light source substrates 122 have the structure shown in FIG. 3.

The bottom cover 124 receives the aforementioned light sources substrate 122 therein. In particular, an opening 118 is formed on a rear surface of the bottom cover 124 to pass through the rear surface. The connector 333 of the light source substrate 122 is projected toward the outside of the bottom cover 124 through the opening 118.

Figure 4:
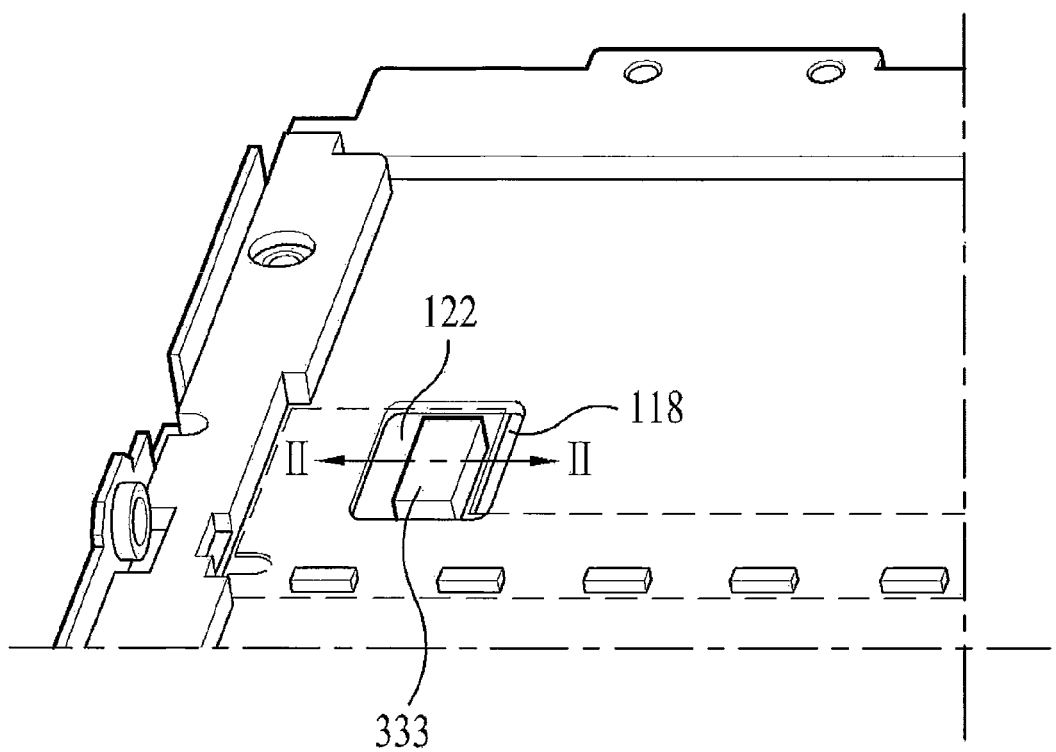
FIG. 4 is a view illustrating a rear surface of a bottom cover of FIG. 3, viewed along an arrow direction.
Figure 5:
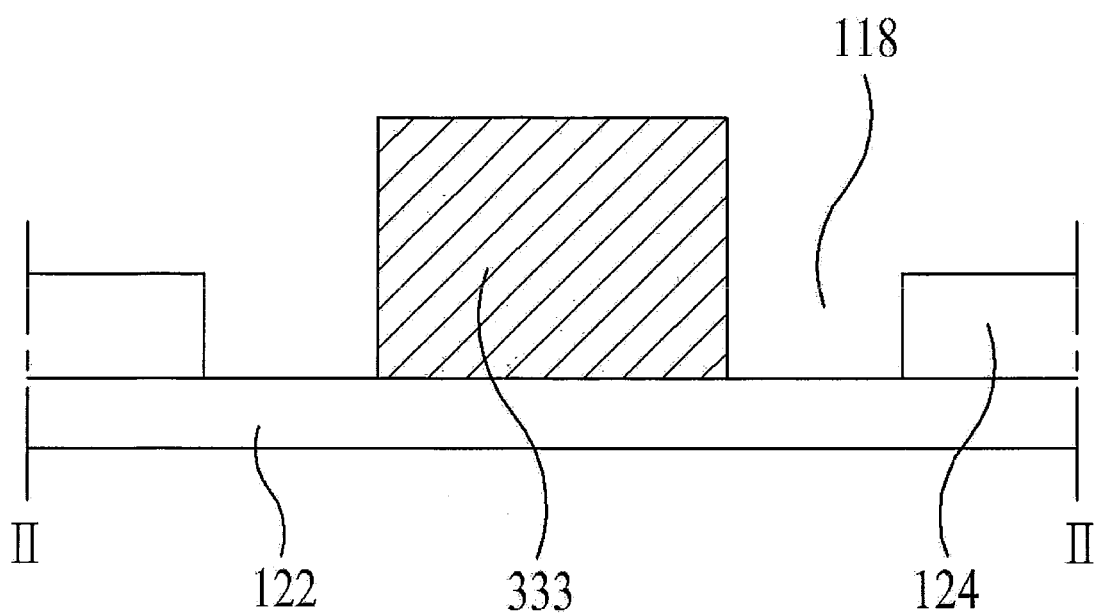
FIG. 5 is a sectional view taken along line II~II of FIG. 4.

FIG. 4 is a view illustrating a rear surface of a bottom cover 124 of FIG. 3, viewed along an arrow direction, and FIG. 5 is a sectional view taken along line II~II of FIG. 4. As shown in FIG. 4 and FIG. 5, it is noted that a part of the connector 333 is projected to the outside of the bottom cover 124 through the opening 118.

Figure 6:
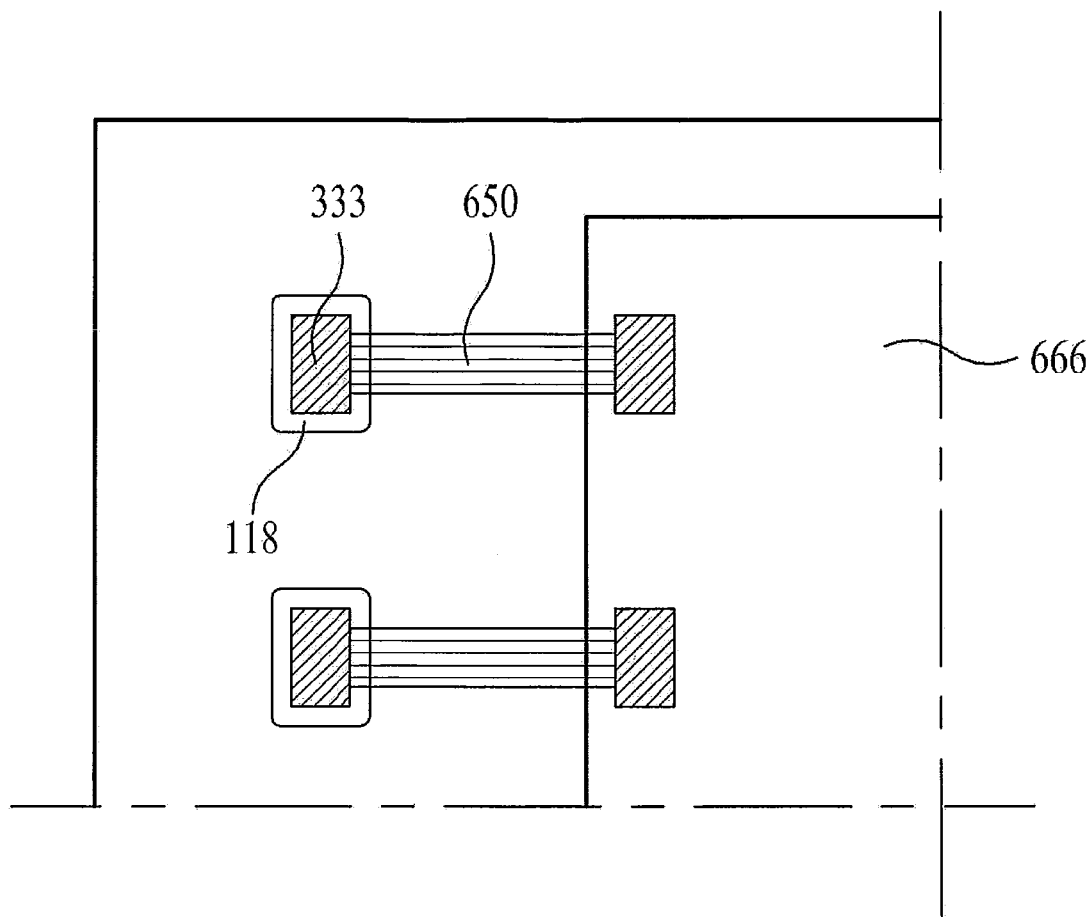
FIG. 6 is a view illustrating a connection relation between a connector and a light source driving integrated circuit.

FIG. 6 is a view illustrating a connection relation between a connector 333 and a light source driving integrated circuit.

As shown in FIG. 6, a light source driving integrated circuit 666 is formed on the rear surface of the bottom cover 124 to generate the driving power source. The light source driving integrated circuit 666 and the connector 333 are electrically connected with each other by a signal transmission portion 650. The signal transmission portion 650 transmits the driving power source from the light source driving integrated circuit 666 to the connector 333. The driving power source transmitted to the connector 333 is supplied to the light sources 120 of the light source substrate 122 through transmission lines of the light source substrate 122 connected with the connector 333. The signal transmission portion 650 can be comprised of a flexible printed circuit.

A plurality of openings 118 are formed on the rear surface of the bottom cover 124 to correspond to each connector 333 of each light source substrate 122. The respective connectors 333 are individually connected to the light source driving integrated circuit 666 through different signal transmission portions 650.

Figure 7:
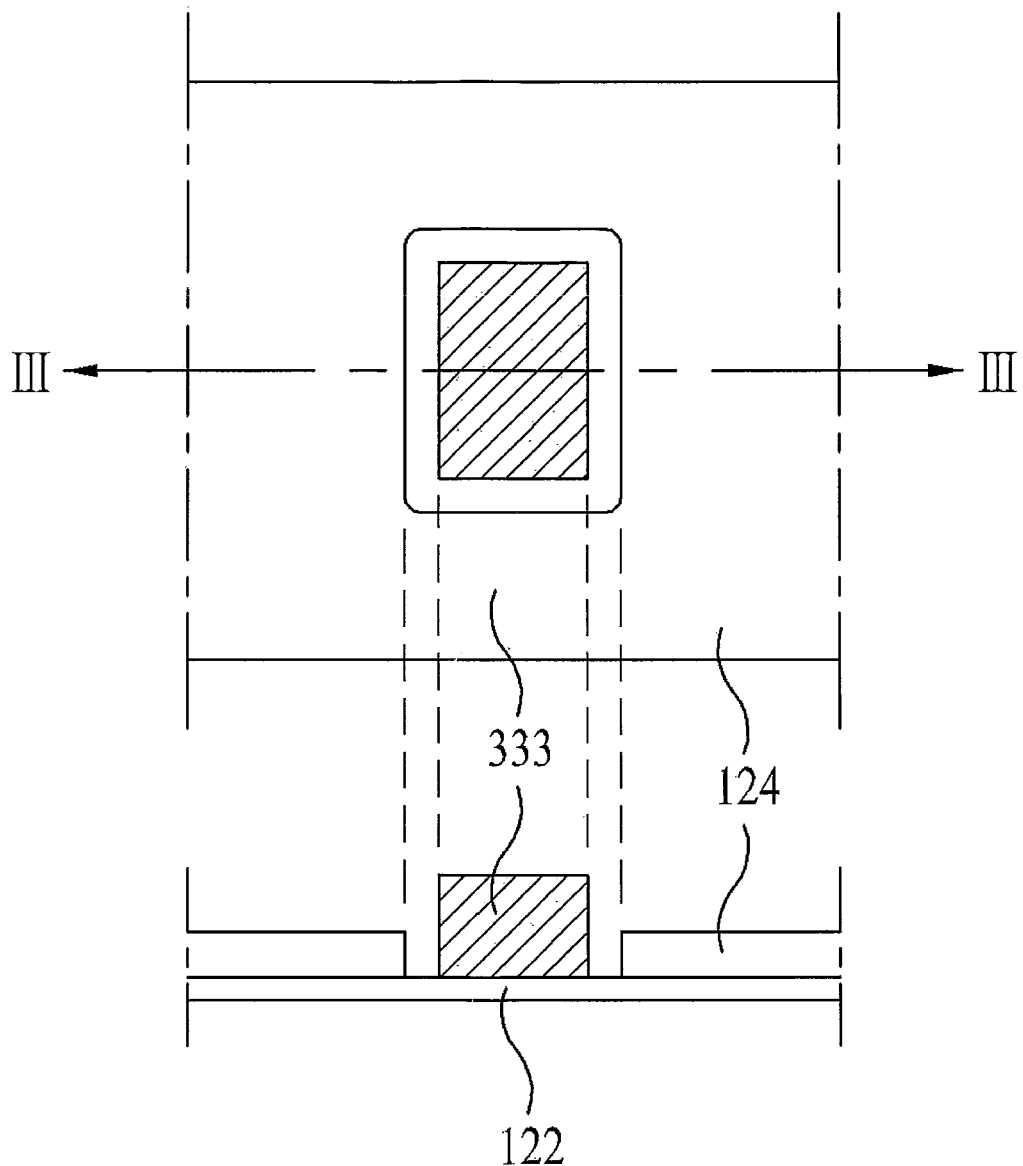
FIG. 7 is a view illustrating another function of an opening formed at a bottom cover.

FIG. 7 is a view illustrating another function of an opening 118 formed at a bottom cover 124.

As shown in FIG. 7, the opening 118 is formed at the same size or almost same size as that of the connector 333, so that the side edge of the connector 333 is in contact with the inner wall of the connector 333, whereby the light source substrate 122 connected with the connector 333 can be prevented from moving. In this case, the fixed projection 302 formed on the bottom of the bottom cover 124 is removed, whereby the receiving space of the bottom cover can be used more effectively.

Figure 8:
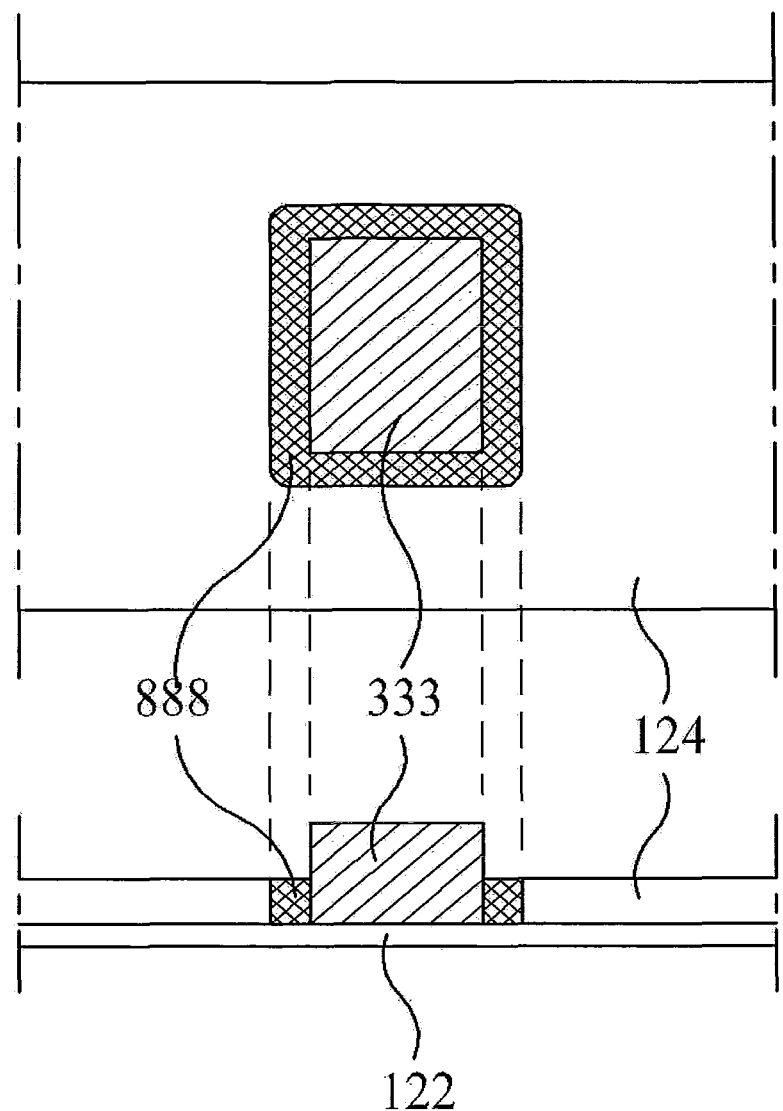
FIG. 8 is a view illustrating an embodiment for enhancing movement preventing effect of an opening formed at a bottom cover.

FIG. 8 is a view illustrating an embodiment for enhancing movement preventing effect of an opening 118 formed at a bottom cover 124. As shown in FIG. 8, the opening 118 is formed at the almost same size as that of the connector 333, and a buffer 888 is formed between the inner wall of the opening 118 and the side edge of the connector 333, whereby the light source substrate 122 can more effectively be prevented from moving. At this time, the buffer 888 can be attached to the inner wall of the opening 118. For example, the buffer can be attached to the inner wall by adhesion. This buffer 888 can be formed of a rubber material having elasticity.

A method for assembling the aforementioned back light unit will be described as follows.

First of all, a plurality of light source substrates 122 are prepared, which having one surface provided with at least one light source 120 and the other surface provided with a connector 333 to which a driving power source for driving the light source 120 is input.

Subsequently, the bottom cover 124 is provided with a plurality of openings 118 that pass through the rear surface of the bottom cover 124.

Next, the light source substrates 122 are received in the bottom cover 124 so that each connector 333 of each light source substrate 122 is projected to the outside of the bottom cover 124 through each opening 118.

Subsequently, the light source driving integrated circuit 666 generating the driving power source is provided on the rear surface of the bottom cover 124.

Afterwards, the respective connectors 333 projected toward the outside of the bottom cover 125 through the opening 118 are individually connected with the light source driving integrated circuit 666 through different signal transmission portions 650.

Then, a plurality of light guide plates 114 corresponding to the number of the light source substrates 122 are prepared and respectively installed at one side of each light source substrate 122.

At this time, the connector 333 can be designed at the same size as that of the opening 118 so that the side edge of the connector 333 is in contact with the inner wall of the connector 333.

Meanwhile, a buffer 888 may further be formed between the inner wall of the opening 118 and the side edge of the connector 333. In this case, the buffer 888 should be attached to the inner wall of the opening 118 before the light source substrate 122 is received in the bottom cover 124.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A back light unit comprising:
   at least one light source substrate having one surface provided with at least one light source and the other surface provided with a connector to which a driving power source for driving the light source is input;
   a bottom cover receiving the light source substrate, wherein the bottom cover includes at least one opening, so that the connector is projected to the outside of the bottom cover, the opening passing through a rear surface of the bottom cover;
   a buffer formed between the inner wall of the opening and the side edge of the connector, wherein the buffer is attached to the inner wall of the opening, and wherein the buffer is of a rubber material having elasticity;
   a light source driving integrated circuit formed on the rear surface of the bottom cover and configured to generate the driving power source and provide the driving power source to the at least one light source via the connector without the buffer connected between the at least one light source and the connector;

a signal transmission portion electrically connecting the light source driving integrated circuit with the connector and transmitting the driving power source from the light source driving integrated circuit to the connector;

a light guide plate received in the bottom cover to be arranged at one side of the light source substrate, guiding light emitted from a light source of the light source substrate to a display panel;

a fixed projection projected from the bottom of the bottom cover; and a fixed groove formed as a curved portion in a side of the light source substrate, wherein the fixed groove is fixed into the fixed projection, wherein the signal transmission portion is a flexible printed circuit, wherein the light source substrate and the light guide plate are received in the bottom cover in a plural number, one light source substrate and one light guide plate form one unit light block in pairs, the display panel is divided into display regions corresponding to the number of unit light blocks, and each unit light block provides light to the corresponding display region, wherein the respective connectors are individually connected to the light source driving integrated circuit through different signal transmission portions, wherein the light source substrate is a light source substrate of a metal material, wherein the light source is a side view type light emitting diode of a side emission mode, wherein the light source substrate includes a first strip portion and a second strip portion extending perpendicularly from the first strip portion, the first strip portion having the one surface provided with the light source, and the second strip portion having the other surface provided with the connector, wherein the buffer is formed only in a portion where the inner wall of the opening overlaps the side edge of the connector height-wise, and wherein the first strip portion and the second strip portion are perpendicular to each other on a same surface plane of the bottom cover.

2. The back light unit of claim 1, wherein the rear surface of the bottom cover is provided with a plurality of openings that project each connector of each light source substrate to the outside of the bottom cover.

3. The back light unit of claim 1, wherein a height of the buffer is less than a height of the connector so that a lower end of the buffer does not reach a lower end of the connector where the signal transmission portion is electrically connected.

4. The back light unit of claim 1, wherein the signal transmission portion electrically connects the light source driving integrated circuit and the connector without the buffer connected therebetween.

\* \* \* \* \*